United States Patent
Squibbs et al.

(10) Patent No.: US 7,607,026 B2
(45) Date of Patent: Oct. 20, 2009

(54) STANDALONE MEMORY DEVICE AND SYSTEM AND METHOD USING SUCH DEVICE

(75) Inventors: Robert Francis Squibbs, Bristol (GB); James Thomas Edward McDonnell, Bristol (GB); Andrew Robert Byde, Wales (GB)

(73) Assignee: Hewlett-Packard Development Company, L.P., Houston, TX (US)

( * ) Notice: Subject to any disclaimer, the term of this patent is extended or adjusted under 35 U.S.C. 154(b) by 791 days.

(21) Appl. No.: 11/056,458

(22) Filed: Feb. 11, 2005

(65) Prior Publication Data

US 2005/0188167 A1 Aug. 25, 2005

(30) Foreign Application Priority Data

Feb. 20, 2004 (GB) ................. 0403758.6

(51) Int. Cl.
*H04L 9/32* (2006.01)
*H04L 9/36* (2006.01)
(52) U.S. Cl. .................... 713/193; 710/200; 726/16
(58) Field of Classification Search ......... 711/115–116, 711/163, 167, 150, 154; 713/183, 185, 193–194; 710/37–40, 200; 726/16–20
See application file for complete search history.

(56) References Cited

U.S. PATENT DOCUMENTS 6,657,543 B1  12/2003  Chung ............... 340/573.1
2003/0005246 A1*  1/2003  Peinado .................... 711/163
2003/0070034 A1  4/2003  Friedman et al. ............ 711/103
2003/0088516 A1*  5/2003  Remer et al. .................. 705/59
2003/0110216 A1  6/2003  Althin et al. ................ 709/204

OTHER PUBLICATIONS

Klaus Finkenzeller, "Fundamental Operating Principles," [*Ch 3 RFID Handbook: Fundamentals and Applications in Contactless Smart Cards and Identification*], p. 29-59, 2003.
Texas Instruments Registration and Identification System (TIRIS) General Reference Manual, "Description of Multipage, Selective Addressable and Selective Addressable (Secured) Transponders," 32 pages, Oct. 4, 1999.
JP 2004021827 A (SONY) See WPI Abstract Accession No. 2004-148814 [15].
JP 2001076107 A [DENON] See WPI Abstract Accession No. 2001-312045 [33].
JP 07105335 A (Toppan Printing) See online PAJ abstract.

* cited by examiner

*Primary Examiner*—Jung Kim
*Assistant Examiner*—Venkat Perungavoor

(57) ABSTRACT

A standalone memory device is provided that when in a first state allows data to be written to the device from a data source but prevents a normal user from useably accessing that data. When in a second state the device enables the user to useably access data stored in the device. The device is arranged to implement a prohibition or restriction on re-entry to its first state after having left it. In preferred embodiments, the device limits the number of times or the frequency at which, it re-enters its first state, whereby to limit the amount or rate of transfer of data via the memory device from the data source to a data recipient. The device can be used to limit content download from data sources at an exhibition. A system and method using the device are also provided.

31 Claims, 5 Drawing Sheets

STANDALONE MEMORY DEVICE AND SYSTEM AND METHOD USING SUCH DEVICE

FIELD OF THE INVENTION

The present invention relates to a standalone memory device and to a system and method using such a device; in particular, but not exclusively, the present invention relates to the use of memory tags for the restricted download of data.

The term "standalone" as used herein in relation to a memory device means that the device is intended to be handled and transported independently of other apparatus as part of its normal use and whilst storing data; it is not intended to imply or require that the device can otherwise be independently used, for example to display stored data, or that the device can be powered up independently of other apparatus (though either or both may be possible).

BACKGROUND OF THE INVENTION

Visitors to exhibition spaces, such as museums and art galleries, often wish to depart with information about one or more topics that have interested them during their visit. Traditionally this have been done by the visitor visiting a bookshop or the like located near the exit of the exhibition where they can purchase hard copy information material (books, prints etc.) and, increasingly, electronic media (pre-recorded audio and video tapes, CD-ROMS, DVDs, etc).

However, frequently only a small part of the contents of such materials will be of interest to any one visitor. What is needed is a more targeted way of making information available to visitors.

One way of doing this would be to provide kiosks at the exit of the exhibition where a visitor could make their own selection of information they require, this information then being written to an electronic media which is provided to the visitor for a price dependent on the value of the information content concerned. Storing the information to an electronic media is more practical than providing hard copy materials because the time taken to create an electronic copy is generally much less than that required to produce a one-off hard copy version of the information concerned.

However, making the information available only at kiosks near the exhibition exit creates a bottleneck. What is needed is a way of distributing the information collection process around the exhibition but in a manner that provides protection for the value of the information concerned.

It is an object of the present invention to provide a way of controlling the transfer of information from data sources to a visitor (or other type of user).

SUMMARY OF THE INVENTION

According to the first aspect of the present invention there is provided a standalone memory device comprising an external interface, a memory, and a control arrangement, the control arrangement being arranged when in a first state to enable data to be written via the external interface to the memory but to prevent a normal user from useably accessing that data through the external interface, and when in a second state to enable the user to useably access, via the interface, data stored in the memory; the control arrangement being further arranged to implement a prohibition or restriction on re-entry to its first state after having left it.

In preferred embodiments, the control arrangement is arranged to limit the number of times, if any, or the frequency at which, it re-enters its first state whereby to limit the amount or rate of transfer of data via the memory device; additionally or alternatively the control arrangement can be arranged to limit the cumulative amount of data stored to the memory for all times the control arrangement is in its first state. The prohibition/restriction placed by the control arrangement on re-entry to its first state can be arranged to be modified or overridden by input from an external privileged entity.

In one embodiment the control arrangement includes device authentication means for authenticating the device to an external data source, and the control arrangement is arranged when in its first state to prevent read access to the memory by said user. With this embodiment, before the data source downloads data to the device, it checks the authenticity and current state of the device and only proceeds with the download if satisfied that the device is authentic and in its first state.

In another embodiment, the control arrangement includes decryption means for decrypting data stored in encrypted form in the memory. In this embodiment, the control arrangement is arranged, when in its second state but not when in its first state, to respond to a user read access request to cause the decryption means to decrypt encrypted data read from the memory whereby to render that data useably accessible to the user. The control arrangement is further arranged to limit decryption by the decryption means to encrypted data that was stored to the memory whilst the control arrangement was in its first state. With this embodiment, a data source provides data in encrypted form and does not need to carry out any authentication of the memory device, relying instead on the presumption that only authentic devices will be able to decrypt the data.

The memory device is for example a radio frequency memory tag attached to or embedded in a card (such as a ticket).

The present invention also encompasses a system for using the standalone memory device comprising, in addition to the device, one or more authorised data sources. The system can also comprise one or more privileged entities for modifying/overriding the aforesaid prohibition/restriction on the device re-entering its first state, and one or more privileged entities for changing the current state of the device's control arrangement.

According to another aspect of the present invention, there is provided a data transfer method comprising operations of:
(a) transferring data from a data source to a standalone memory device, and
(b) transferring the data from the memory device to a data recipient; the number of times, or the frequency at which, operations (a) and (b) are carried out being restricted by the standalone memory device whereby to limit the amount or rate of data transfer.

BRIEF DESCRIPTION OF THE DRAWINGS

Embodiments of the invention will now be described, by way of non-limiting example only, with reference to the accompanying drawings, in which.

DETAILED DESCRIPTION OF THE PREFERRED EMBODIMENTS

The embodiments of the invention to be described hereinafter provide a standalone memory device for collecting a restricted amount of data from information sources such as information points provided around an exhibition space (for example, a museum). In the illustrated embodiments the standalone memory device takes the form of a memory tag embedded in or attached to a base medium such as a card; the card could, for example, serve as an admission ticket to an area accommodating data sources authorised to download data to the memory tag.

Memory tags in the form of Radio Frequency Identification (RFID) tags are well known in the prior art. RFID tags come in many forms but all comprise an integrated circuit on which in use information can be stored and a coil which enables it to be interrogated by a reader which also powers it by means of an inductive (wireless) link. Until recently RFID tags have been quite large, due to the frequency they operate at (13.56 MHz) and the size of coil they thus require, and have had very small storage capacities. Such RFID tags have tended to be used in quite simple applications, such as for file tracking within offices or in place of or in addition to bar codes for product identification and supply chain management.

Much smaller RFID tags have also been developed, operating at various frequencies. For example Hitachi-Maxell have developed "coil-on-chip" technology in which the coil required for the inductive link is on the chip rather than attached to it. This results in a memory tag in the form of a chip of 2.5 mm square, which operates at 13.56 MHz. This chip is capable of both being read and being written to. In addition Hitachi has developed a memory tag they call a "mu-chip" which is a chip of 0.4 mm square and operates at 2.45 GHz. This chip is written with data during the manufacturing process in Read-Only-Memory (ROM), but is small enough to be embedded in paper.

Figure 1:
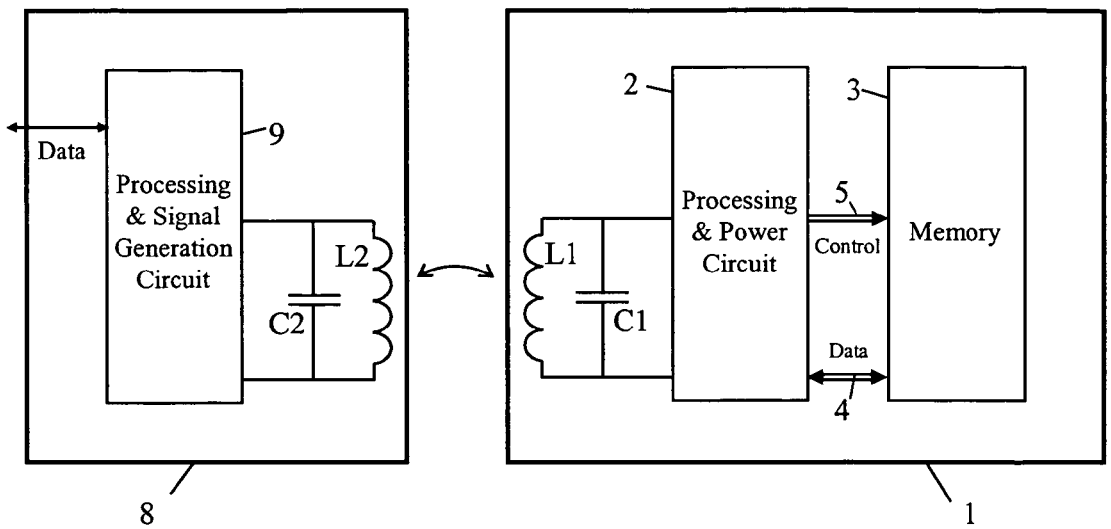
FIG. 1 is a diagram of a prior art memory tag and read/write device.

FIG. 1 illustrates the main functional components of a known RFID tag 1 and a tag read/write device 8. Each memory tag 1 includes an antenna coil L1 and a capacitor C1 connected in parallel therewith to form a resonant circuit. Each tag 1 further includes a memory 3 and processing and power circuitry 2, the latter not only being arranged to supply power to the memory 3 but also to exchange control and data signals with it over control and data channels 4 and 5. The control signals typically comprise read/write signals and address signals (though the latter can be omitted where the memory 7 is designed to be written to, and read from, as a whole always beginning at the base address of the memory, the memory itself taking care of cycling its addresses for such operation). The read/write device 8 includes an antenna coil L2 and a capacitor C2 in parallel therewith to form a resonant circuit, and a processing and signal generating circuitry 9.

A signal generator within circuitry 9 generates a signal at the chosen frequency, such as 2.45 GHz; this signal is applied to the antenna coil L2 and thus generates an electro-magnetic field which, provided the memory tag 1 is sufficiently close to the read/write device 8, penetrates the antenna coil L1 of the memory tag 1. By induction a voltage is thus generated in the antenna coil L1. This induced voltage is rectified in circuitry 2 and used to power the memory tag 1. The capacitance of the capacitors C1 and C2 is selected such that the resonant circuits are both resonant at the frequency generated by the signal generator, in order to maximise transmitted signal strength and received signal.

When data is to be written to the memory tag 1 by the read/write device 8 the radio frequency signal generated in circuitry 9 is modulated, e.g. amplitude modulated, with the data before being applied to the antenna coil L2 and transmitted. The signal received by the memory tag 1 by inductive coupling thus both powers the memory tag 1 and communicates with it, the circuitry 2 separating the control and data signals from the carrier and passing them to the memory 3 where the data is stored.

Similarly, if data is to be read from the memory tag 1 the circuitry 2 applies a signal indicative of the data to the antenna coil L1 which is detected, as a result of the inductive coupling, by antenna coil L2 and deciphered in circuitry 9 before being output from the read/write device 8. This signal may for example be transmitted using load modulation. In RFID systems such as this the power consumed by the memory tag 1 can be measured as a drop in voltage across the internal resistance of the antenna coil L2 of the read/write device 8. A load resistance within the circuitry 2 may be switched on and off, thus altering the power consumed by the memory tag 1 which is then detected as an amplitude modulation of the voltage across the antenna coil L2 of the read/write device 8.

Further details of RFID memory tags can be found, for example, the RFID Handbook, Klaus Finkenzeller, 1999, John Wiley & Sons).

Figure 2:
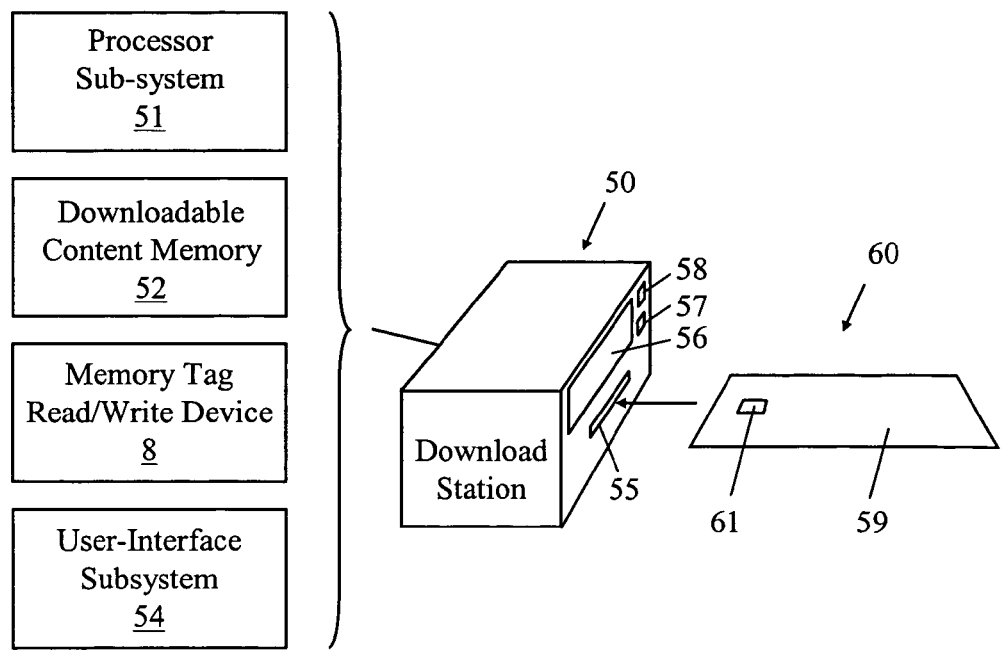
FIG. 2 is a diagram illustrating a download station and a first embodiment of a memory device according to the invention.

As already indicated, in the illustrated embodiments of the invention an RF memory tag is embedded in or attached to a base medium to provide a standalone memory device. FIG. 2 depicts such a device 60 in which a memory tag 61 is attached to a base medium in the form of a card 59 that, in the example application described below, also serves as an entry ticket to an exhibition. As will be more fully explained hereinafter, the memory tag 61 comprises control circuitry additional to that provided in the prior art memory tag illustrated in FIG. 1.

FIG. 2 shows, in addition to the memory device 60, a data source in the form of a download station 50 for writing data to the device. The download station 50 comprises a memory tag read/write device 8 (for example, of the form described above in relation to FIG. 1), a processor sub-system 51, a memory 52 for holding content data for download to memory devices 60, and a user interface sub-system 54. The user interface sub-system 54 comprises a visual display screen 56, a selection control 57 for selecting a displayed item (for example, a menu item), and an "enter" control 58 for initiating an action in respect of a displayed option or item selected using the selection control 57. In general terms, use of the download station 50 involves a user of memory device 60 inserting the portion of the card 59 carrying the memory tag 61 into a slot 55 in the front face of the station 50 to position the memory tag appropriately for reading/writing by the read/write device 8. This results in the processor sub-system 51 being informed of the presence of the memory device 60 and, in a basic implementation of the station 50, causes the processor sub-system 51 to carry out certain checks in relation to the memory tag 61 before controlling the read/write device 8 to write the content data stored in the memory 52 to the memory tag 7. In more complex implementations, there may be a choice of content data items available for download in which case the processor sub-system 51 oversees a user-interaction session, effected via the interface sub-system 54, in which the user is enabled to select content for download. Other functionality can also be provided—for example, the opportunity could be provided to the user to request a listing on display 56 of the current contents stored in the memory device with the further option of deleting certain content to make way for new content to be downloaded by the station 50 to the memory device 60. The download station 60 can also be arranged to permit the user to select a current item stored in the memory device for presentation in full via the user interface subsystem 54.

As will be more fully described hereinafter, reading and writing of the memory device 60 by the download station 50 typically involves the carrying out of certain checks by one or both of the station 50 and device 60.

Figure 3:
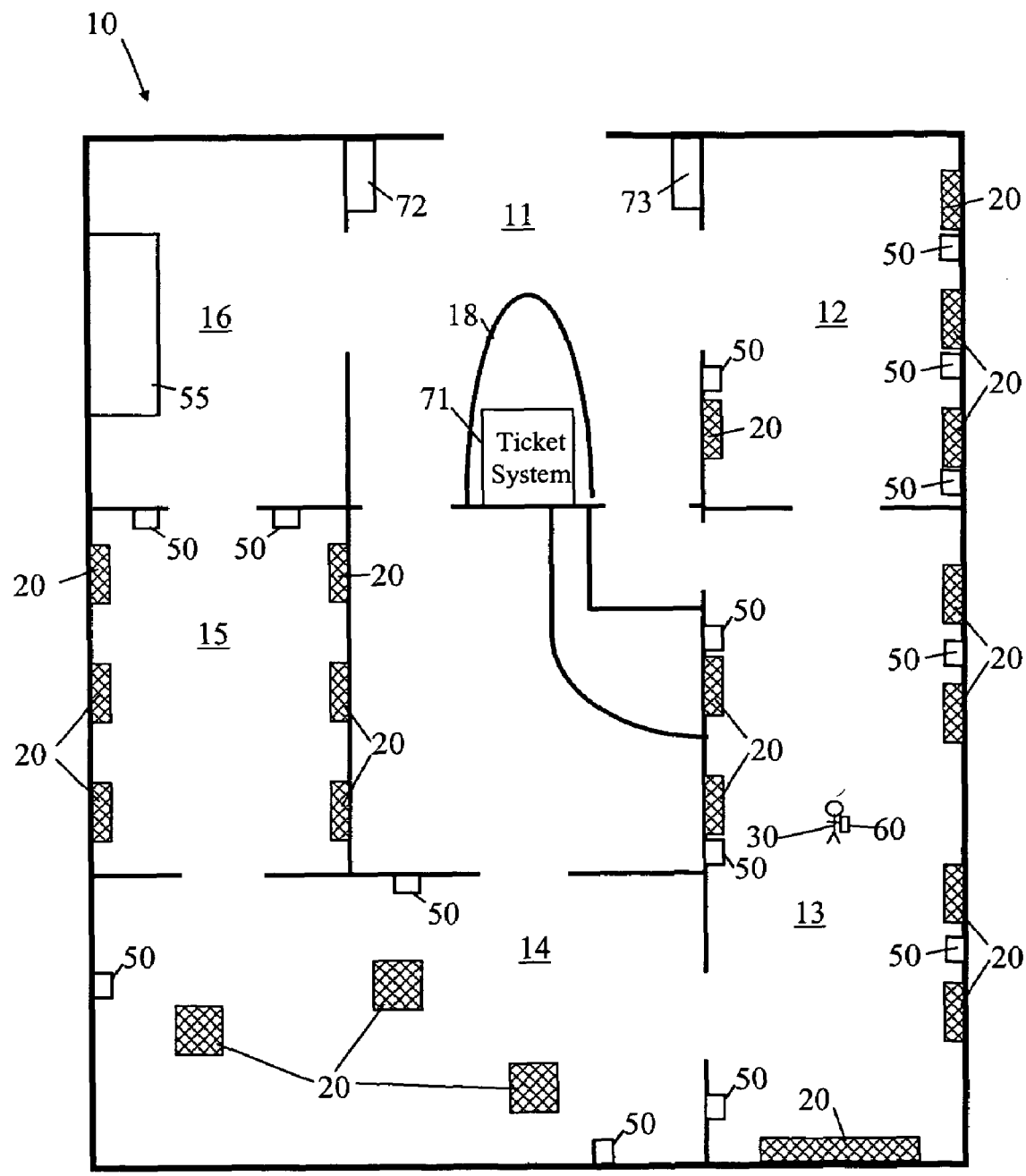
FIG. 3 is a diagrammatic plan view of an exhibition hall incorporating content download stations of the FIG. 2 form.

FIG. 3 depicts an example environment where the standalone memory device 60 can be employed; in this case the environment is an exhibition hall 10 incorporating a number of content download stations 50. More particularly, the hall comprises an entrance lobby 11 with a reception desk 18 at which is located a ticket system 77 for issuing visit tickets in the form of a card 59 carrying a memory tag 61, that is, in the form of a memory device 60 for collecting and storing content items from download stations (data sources) 50 encountered at various locations around the hall 10. All visitors can be provided with a ticket in the form of a device 60 or else such tickets can be provided at a premium to normal tickets that do not have memory tags. Hereinafter, tickets in the form of memory devices 60 will simply be called memory devices 60 and their ticket function will not be referred to unless needed to explain the context of a particular operation.

Depending on the precise form the memory device 60, the memory devices issued by the reception desk 18 to visitors may need no preparation before issue, being already in a state ready for use, or may require to be suitably initialised by the ticket system 71 before being issued, as will be explained below.

The hall 10 further comprises exhibition spaces 12 to 15 in which exhibits 20 are displayed; in each of these spaces is one or more download stations 50 for downloading content item data to the memory device 60 carried by a visitor 30 (here shown in space 13 with his/her device depicted on a much larger scale). Each download station 50 holds a limited number of content items, namely those of relevance to the nearby exhibits 20. The hall further comprises a media room 16 with a media desk 55 where a visitor can view and modify the contents collected using their device 60 in passage through the exhibition spaces 12-15. The function of the media desk 55 is similar to that of a download station 50 but covers the content available at all the download stations.

The reception lobby 11 further includes an exit state-change station 72 and an entry state-change station 73. Both of these stations are privileged tag read/write entities for changing the operating state of certain embodiments of the memory device 60 as will become clear hereinafter.

Figure 4:
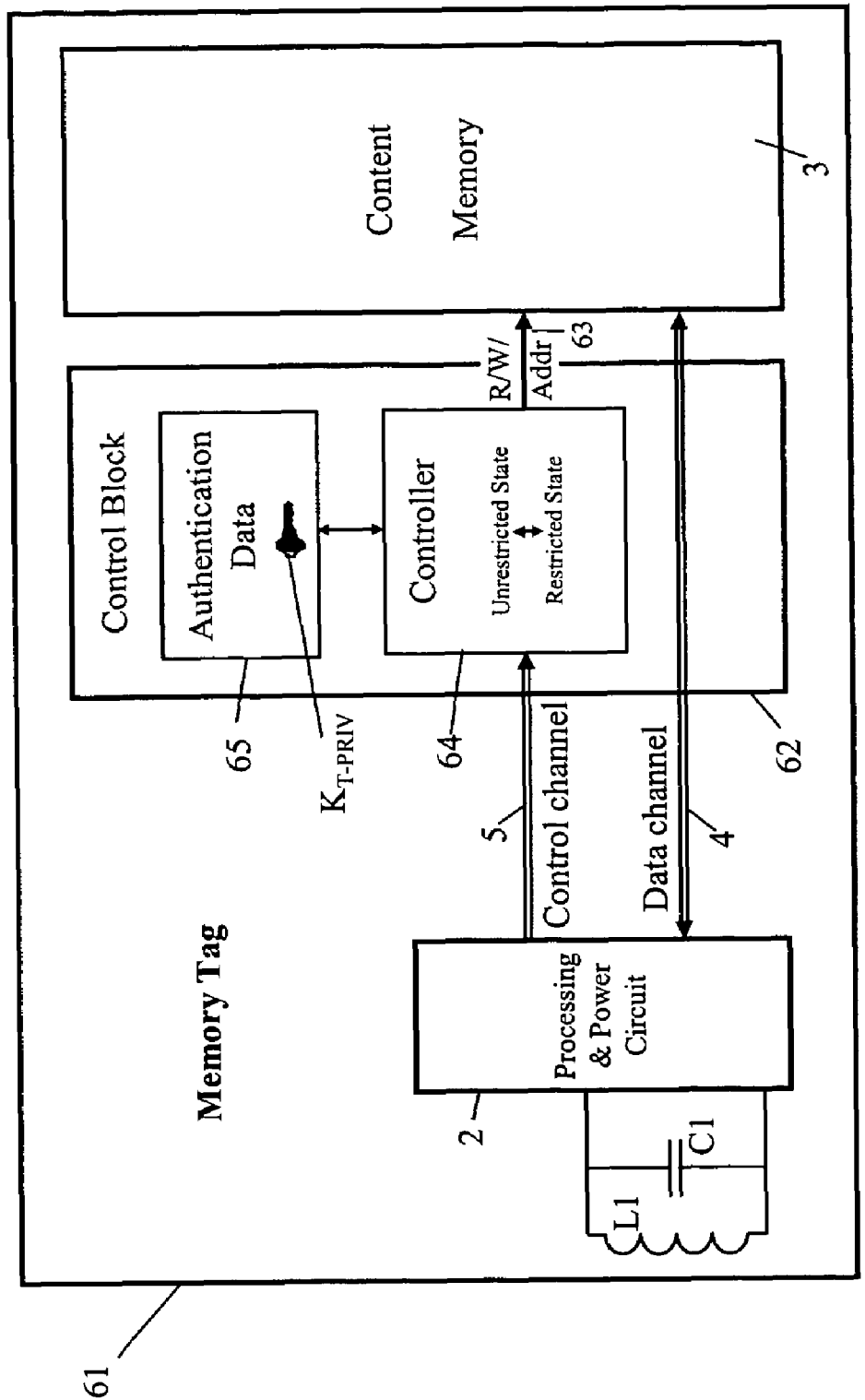
FIG. 4 is a block diagram of a memory tag of the FIG. 2 memory device showing a first form of control block.

FIG. 4 is a block diagram of a first embodiment of the memory tag 61 of the standalone memory device 60. As can be seen, the FIG. 4 memory device 60 includes an additional control block 62 as compared with the prior art memory tag illustrated in FIG. 1. This control block 62 is shown situated between the processing and control circuit 2 and the content memory 3; in practice, the control block 62 will be combined with the control circuit 2 but is here shown separate to facilitate a clear understanding of the extra functionality provided by the control block 62.

The control block 62 of the FIG. 4 embodiment comprises a controller 64, and an internal memory 65 for storing authentication data 65 for authenticating the memory tag 61 to external entities and, in particular, to the download stations 50. In the present example, the authentication data stored in memory 65 is a private key $K_{T\text{-}PRIV}$ of a public/private cryptographic key pair, the corresponding public key $K_{T\text{-}PUB}$ being known to the download stations 50. In order to authenticate the memory tag as a genuine tag (and therefore one that functions in a known manner to protect data stored the tag), a standard challenge/response exchange is used between a download station 50 and the memory tag 61. More particularly, a download station is arranged to encrypt a nonce (random data) using the public key $K_{T\text{-}PUB}$ and then to pass the encrypted nonce as a "challenge" to the memory tag 61; the tag must now decrypt the nonce using its private key $K_{T\text{-}PRIV}$ and return the decrypted nonce to the download station. If the returned decrypted nonce corresponds to the original nonce, the download station considers that the memory tag 61 has been successfully authenticated. The authentication process is controlled in the download station 50 by the processor sub-system 51 and in the memory tag 61 by the controller 64. Of course, since many memory devices 60 and therefore memory tags 61 will be in use at any one time, either all the tags need to store the same private key $K_{T\text{-}PRIV}$ or some means needs to be provided to enable a download station to know which public key to use in the challenge phase. With regard to this latter option, each memory tag 61 can be provided with a simple ID readable by the download station, there being no need for this ID to be secure; the download station is then provided with a table matching tag IDs to their respective public key (or else the download station is provided with a communication arrangement for contacting a central resource where such a table is stored).

It is assumed that the memory tag 61 is at least tamper resistant making it difficult for the authentication data stored in memory 65 to be discerned by an unauthorised reverse engineering techniques. Making the tag 61 tamper resistant also provides protection for the content data stored in the content memory 3.

Other forms of authentication are also possible as will be described hereinafter.

The main function of the controller 64, apart from participating in the foregoing authentication process, is to protect the content data stored to the memory 3 by the download stations by controlling access to the memory 3. To this end, the controller 64 is arranged to have two main operating states, namely a restricted state 101 and an unrestricted state 102 as depicted in the FIG. 5 state diagram. The controller 64 has non-volatile memory in which it stores its current state.

Figure 5:
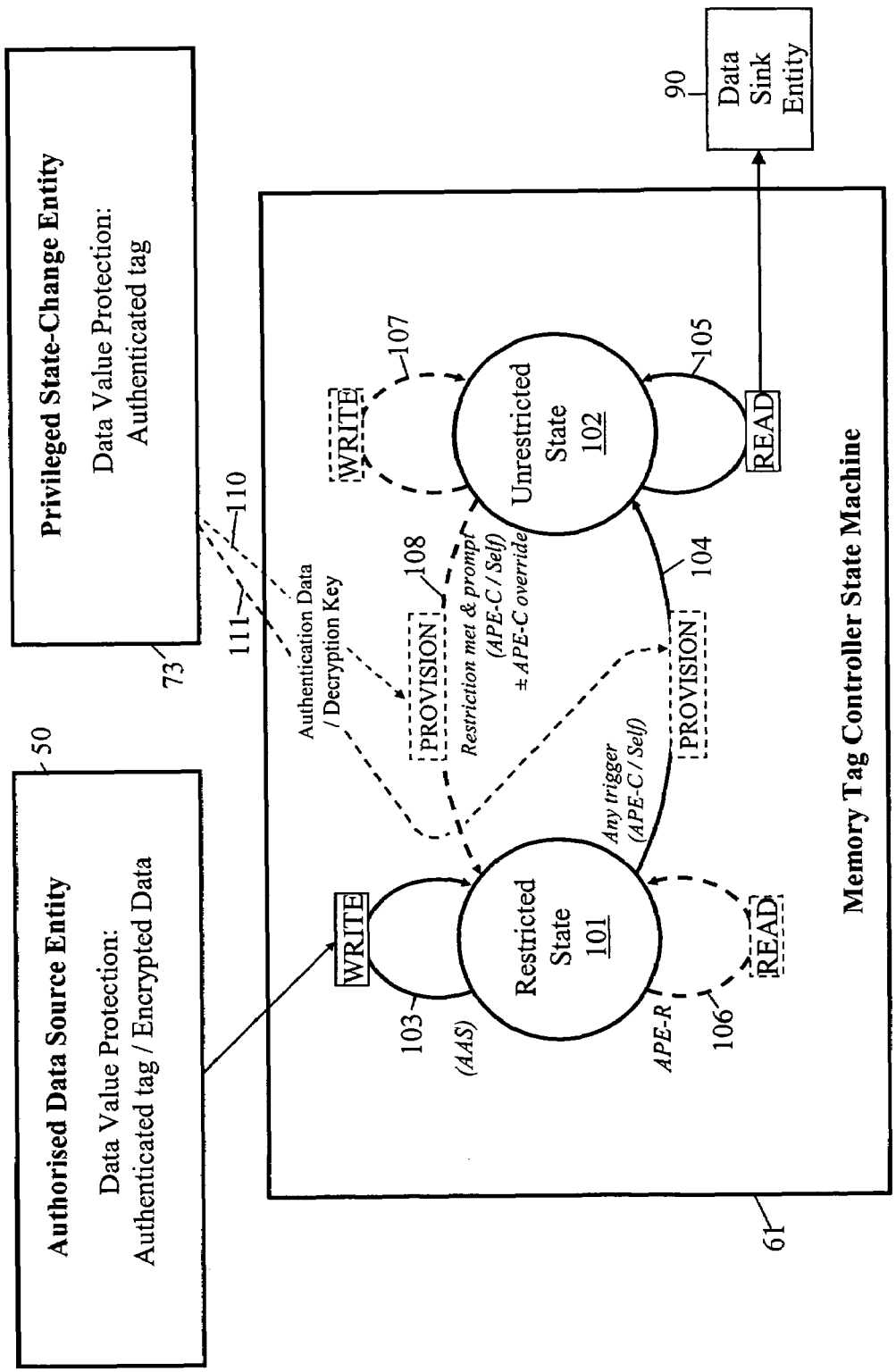
FIG. 5 is a state diagram illustrating the operation of the control block of the FIG. 4 memory tag.

In the FIG. 5 state diagram, the possible transitions between states (including transitions starting and finishing with the same state) are shown as arcs in the form of arrows. Actions associated with transitions are shown as boxed legends on the corresponding arcs. Conditions triggering a particular state transition are given at the start of the corresponding arc; conditions given in brackets are alternative conditions to those given un-bracketed. In a basic form of the first embodiment of the tag 61, only the transitions and actions not shown dashed are applicable; the transitions and actions shown in dashed lines apply either to variants of the first embodiment or to a second embodiment to be described below.

In the first embodiment of the tag 61, the controller 64 is initially set in its restricted state 101; in this state, it allows any external data-source entity (such as a download station 50) to write data to the content memory 3 (arc 103) but does not permit the memory 3 to be read. When triggered by an appropriate signal generated by any external or internal entity (for example, a user input signal), the controller 64 changes to its unrestricted state 102 (see arc 104); in this state, the controller 64 allows any data sink entity 90 (such as the user's home computer) to read data from the content memory 3 (see arc 105). The controller 64 does not permit its state to be reset to its restricted state 101.

In use of the memory tag, such as in the current exhibition hall example context, the user (visitor) after obtaining their memory device 60 (ticket) with the attached memory tag 61 (whose controller 64 is in its restricted state), can go to any of the download stations, insert their memory device 60, and download one or more content items up to an amount corresponding to the size of the memory 3. Whenever the user inserts the memory device 60 into a download station 50, the station first authenticates the memory tag as being a genuine authorised tag using the challenge/response mechanism described above. After this challenge has been satisfied, the download station checks that the controller 64 is in its restricted state; provided this is the case, content download is then effected (with or without an preliminary phase of user selection of content) up to the maximum size of the memory 3. The first embodiment of the controller 64 can be arranged to allow memory overwriting or can simply only write to free memory locations. To access the data, the user must change the state of the controller 64 to its unrestricted state but this removes any possibility of subsequently writing data to the memory 3 because the controller cannot re-enter its restricted state in which the memory 3 can be written. The maximum amount of data that can be taken away from the exhibition hall by the user is thus restricted to the size of the memory 3 even in the case where the user is carrying a device for reading the memory tag 61 thereby enabling the user to transfer the contents of the memory 3 to another device.

With the controller 64 in its unrestricted state 102, the user can effect transfer of data off the memory device 60 at a time and place convenient to the user such as at home. To cover the situation that the user does not have a tag read/write device at home, the media desk 55 can be provided with transfer equipment for transferring the data to a storage medium of the user's choice (for example, hard-copy media, floppy disc, CD-ROM, printed T-shirt, etc) or otherwise making the data available to the user (for example, by sending it in an email to the user).

A number of variants are possible to the first embodiment of the controller and some of these variants are described below.

(a) The controller 64 can be arranged to check that only authorised data-source entities (in the present example context, the download stations 50 and media desk 55 of the exhibition hall 10) are allowed to write to the memory 3 when the controller 64 is in its restricted state 101. To this end, the controller 64 is arranged to carry out an authentication check of any data source entity wishing to write to the memory 3 when the controller is in state 101. A similar challenge/response mechanism to that already described can be used based on a public/private key pair $K_{S\text{-}PUB}/K_{S\text{-}PRIV}$ associated with the authorised data-source entities; in this case, the public key $K_{S\text{-}PUB}$ is held by the tag 61 in authentication data memory 65 and is used by the controller 64 to issue a challenge which can only be correctly responded to by entities possessing the corresponding private key $K_{S\text{-}PRIV}$. This authentication of the data source entity as an authorised entity is depicted in FIG. 5 by the bracketed condition "AAS" (Authenticated Authorised data Source) shown at the start of the arc 103.

(b) Whilst the controller 64 is in its restricted state 101, the controller 64 can be arranged to allow a privileged entity, which it has authenticated as such, to read the contents of the memory 3. In the present example context, each download station 50 and the media desk 55 is preferably such a privileged read entity and the authentication of the station described in (a) above can also serve as its authentication as a privileged read entity. In this case, the user can use a download station/media desk to review the data already stored in the memory 3 as outlined above when describing the stations 50. This privileged read capability is depicted in FIG. 5 by the dashed arc 106, the condition on the arc being shown as "APE-R" ("Authenticated Privileged Entity-Read").

(c) A condition can be set by the controller 64 on the transition from the restricted state 101 to the unrestricted state 102. For example, the condition can be that this transition can only be triggered by a privileged state-change entity after authentication (effected, for example, using a challenge/response mechanism similar to that already described). In the present example context, the exit state-change entity 72 could be used as a privileged state-change entity for changing the controller 64 into its unrestricted state upon the user leaving the exhibition hall (the user momentarily inserting their memory device 60 into the entity 72 as they leave).

Figure 6:
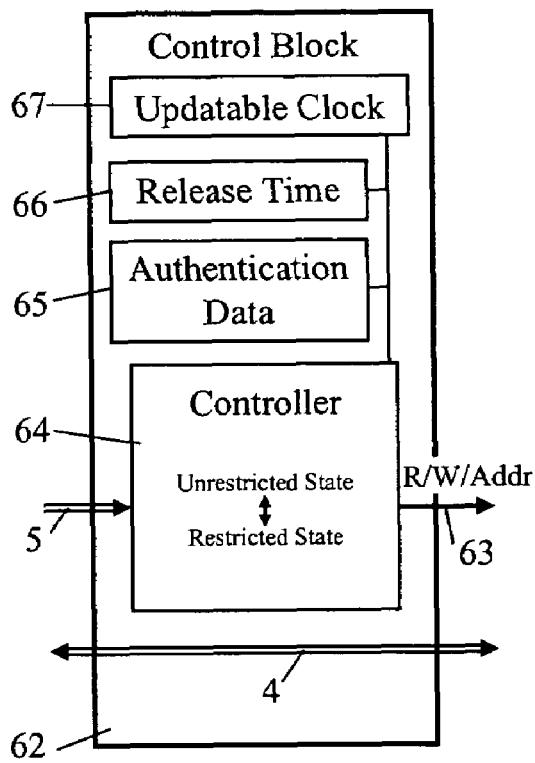
FIG. 6 is a block diagram of a variant form of control block of the FIG. 4 memory tag.

The condition for triggering a transition to state 102 can alternatively be the generation of an internal trigger. Such a trigger can, for example, be generated upon the memory 3 becoming full. Another example of an internal trigger is a time-based trigger and FIG. 6 illustrates a modified form of the control block 62 adapted to provide such a trigger. As can be seen, the control block 62 of FIG. 6 comprises, in addition to the controller 64 and memory 65, a register 66 holding a release time (typically a date and time of day), and an updatable clock 67 that can have its current time (date and time of day) updated by the controller 64 in response to external time data received from an authenticated privileged entity. In the example exhibition-hall context, the privileged entity is preferably each of the download stations 50, the media desk 55, and the exit entity 72. In the FIG. 6 control block 62, the controller 64 is arranged to generate an internal trigger causing it to change from state 101 to state 102 when the time according to the updatable clock 67 reaches the release time set in the register 66. The release time is set when the memory device 60 is issued, this being doen by the ticket system 71 acting as a privileged read/write entity (the controller being arranged to authenticate this entity before allowing it to write the release time). As a result, the user cannot access the data written to the memory 3 by the download stations 50, until at least the time specified in register 66. If the tag 61 was continuously powered, the actual time of transition to state 102 would coincide with the release time specified in register 66; however, since the tag is only intermittently powered, it will take longer for the clock 67 to reach a time value corresponding to that in register 66. To reduce the delay, the clock 67 is updated whenever the user inserts the memory device 60 into one of the privileged entities noted above. Even so, once a user leaves the hall 10, the memory device must be powered up for a period sufficient to advance the clock to the time set in register 66 before the controller changes to state 102 allowing the data in memory 3 to be read.

(d) The controller when in its unrestricted state can be arranged to permit any entity to write to the memory 3 as depicted by the dashed arc 107 in FIG. 5.

(e) Rather than re-entry to the restricted state 101 being prohibited entirely, such re-entry can be allowed on a restricted basis, that is, only if predetermined restriction conditions are satisfied will the controller 64 permit the restricted state 101 to be re-entered when a prompt signal is received calling for such a transition back to state 101. In the most general case, the prompt signal can be received from any internal or external entity. The transition from state 102 to state 101 is depicted in FIG. 5 by dashed arrow 108. Of course, the significance of allowing return to the restricted state 101 is that the memory 3 can now be re-used to store fresh data, thereby multiplying its data transfer capacity; however, the restriction on re-entry to state 101 serves to limit this data transfer.

The restriction placed on re-entry to state 101 can be a numerical restriction—that is, only a specific number of re-entries are permitted with each re-entry resulting in the controller decrementing a count held in non-volatile memory until no more re-entries are permitted by the controller 64. Such a restriction serves to limit the total amount of data that can be transferred using the memory device 60. In the current example context, the visitor can be required to pay an amount for their ticket/memory device 60 that is related to the initial count value stored in the controller 64. Preferably, this initial count value can be programmed into the device 60 by the ticket system 71 acting as a privileged read/write entity, the controller 64 only accepting such programming after having authenticated the ticket system 71 as a privileged read/write entity with authority to write in a count value (again, such authentication can be effected by a challenge/response mechanism similar to that already described). Thus, a user can specify how many times they wish to be able to re-use the memory device, pay the corresponding amount, and receive a ticket/memory device 60 programmed with the corresponding count by the ticket system 71. It may be noted that the programmed count should be set one less than that specified by the user since the controller 64 of the memory device is initially in its restricted state 101. Of course, now that re-entry to state 101 is possible the controller 64 need not initially be in state 101 but could initially be in state 102 in which case the initial count value would correspond to that requested by the user.

As a further restriction (additional to the re-entry count) the controller can optionally require that the prompt to change state must be received from a privileged state-change entity after authentication of the latter (for example, using a challenge/response mechanism similar to that already described); in the present example context, the entry state-change entity 73 can serve in this role with a returning visitor to the hall 10 placing their memory device 60 into the entity 73 to have its controller 64 reset into its restricted state 101 (provided the count restriction is met) so that the visitor can download more data from the stations 50.

Alternatively, or additionally, to the restriction on re-entry to state 101 being based on a count, the restriction can be based on the frequency of re-entry with this being limited to no more than once per unit period (for example, once every day or week). Such an arrangement has the effect of limiting the rate of data transfer via the memory device. Of course, in the present embodiment in the form of a memory tag that is only intermittently powered up, reliable timing can only be effected by an external entity. Therefore, to determine whether a re-entry to the restricted state 101 is permissible having regard to the length of time that has elapsed since the last entry, the controller is arranged to store the time of last entry to state 101 in non-volatile memory and then to subtract this time from a current time value obtained from a reliable external source and compare the result with a stored minimum elapsed time value—only if the determined elapsed time is equal to or greater than the stored minimum, is entry into state 101 permitted. With this arrangement, the controller is required to authenticate the external time source as a trustable source using a challenge/response mechanism similar to that already described. For the current example context, this trustable time source can conveniently be provided by the entry state-change entity 73 (particularly where re-entry to state 101 also requires a prompt from this entity as described above). In embodiments of the memory device that have internal power sources, the reliable time source can be provided within the control block 62 as can the source of the prompt signal (this also being the case where the restriction is simply count based).

Another possible type of restriction that can be applied by itself or jointly with one or more of the other types of restriction described above, is a restriction on the cumulative amount of data that can be stored to the memory 3 the or all the times the controller 64 is in its restricted state 101. By itself, such a restriction would enable a user to purchase a particular data transfer capacity (referred to below as the "permitted data amount"), and then use up this permitted data amount in the course of several visits with data being read from the device between visits. To implement this restriction, the value of the permitted amount of data is stored to the controller 64 on initialisation by the ticket system 71; the device 60 is then used to collect data and when the controller 64 is triggered to transit from state 101 to state 102, the controller 64 records the amount of data stored in the memory 3 whilst the controller was in its state 101. Thereafter, re-entry to state 101 is restricted and only permitted if the recorded amount of data written to the memory whilst in state 101 is less than the stored permitted data amount; furthermore, after re-entering state 101, the controller 64 tracks the further amount of data stored to memory 3 in this state 101 and when the cumulative total of this further data and the recorded amount of data stored when the controller was previously in state 101, reaches the stored permitted data amount, the state 101 is exited. If the limit of the stored permitted data amount is not reached before the state 101 is exited due to a different cause, the aforesaid cumulative total is recorded for subsequent use as the recorded amount of data written to the memory whilst in state 101. The above process continues until all the permitted data amount has been used.

(f) The controller 64 can be arranged to accept override or modification by an authenticated privileged entity of the controller's prohibition/restriction on re-entry into state 101; authentication of the privileged entity can be effected using a challenge/response mechanism similar to that already described. Thus in the case of the basic form of the first embodiment of the controller 64 where no resetting into state 101 is normally permitted, if, in the context of the current exhibition hall example, a returning user wishes to reactivate a previously-used memory device 60, the user goes to the reception desk 18, pays an appropriate fee and has their memory device 60 re-activated by a privileged tag read/write entity of the ticket system 77. The re-activation process starts by the ticket system and memory device authenticating each other as genuine; thereafter, the ticket system commands the controller to change its state to state 101. In a similar manner, where re-entry by the controller to its restricted state 101 is subject to restriction, the nature of this restriction can be modified by the ticket system acting as a privileged entity, again after the ticket system and memory device have authenticated each other. Thus, where the restriction is based on the number of times state 101 can be re-entered, this number can be modified, whereas if the restriction is based on the frequency of re-entry, this frequency can be modified.

(g) Where the controller can re-enter its state 101 (either because re-entry conditions have been met or because these conditions or a prohibition have been overridden), it may be desirable to change the authentication data stored in the memory 65 of the memory device 60 either on each re-entry or periodically. Of course, the controller 64 only permits changing of the authentication data when interacting with an authenticated privileged entity that has the authority to effect such changes; conversely, such an entity will only provide authentication data to a memory device 60 it has authenticated as genuine. By way of example, in the exhibition hall context, where the controller 64 of a memory device 60 is restricted to one re-entry to state 101 each week, and the public/private key pair $K_{S\text{-}PUB}/K_{S\text{-}PRIV}$ of the download stations 50 is changed on a weekly basis, then in the case where the entry state-change entity 73 must be used to return the controller 64 of the memory device to its state 101, this entity 73 is also arranged to replace in memory 65 the previous week's version of the key $K_{S\text{-}PUB}$ with the version applicable to the current week (see dashed arrow 110 in FIG. 5).

(h) The controller 64 can be arranged to artificially restrict the size of the memory 3 in response, for example, to an authenticated privileged entity requesting it to do so. One reason for doing this is that it permits the user to pay for downloading an amount of data less than the full capacity of the memory; in this case, the controller 64 can simply instruct the memory 3 to treat the upper address location of the memory as a particular value, less than the real value. In the current example context, the ticket system 77 can serve as the privileged entity with authority to set the memory capacity.

It is also possible for different content data items to be given different values by setting how much space in memory 3 each item at least appears to occupy. Thus, if the controller 64 is interfacing with an authenticated authorised data-source entity that requests that an item to be downloaded be treated as a double value item, then the controller can cause the item to take up twice the amount of memory capacity as would normally be the case. This can be achieved in a number of ways; for example, a padding byte could be added after each byte of the data item as it is stored to memory 3, or the address controller for the memory 3 could be arranged to skip every other memory location, or the value of the upper addressable location of the memory can be decremented by the size of the item.

It is to be understood that the above variants can be used individually or in any suitable combination. Depending on the variations implemented, the memory device 60 may be required to authenticate several different types of external entities such as the download stations 50, the exit and entry state-change entities 72 and 72, and the ticket system 77. Whilst each of these entities can have its own associated public/private key pair of which the public key is stored in the memory 65 of the device 60, it will generally be acceptable to use a common public/private key pair for all the external entities that need to authenticate themselves to the memory device, thereby requiring only a single public key to be stored in memory 65.

Figure 7:
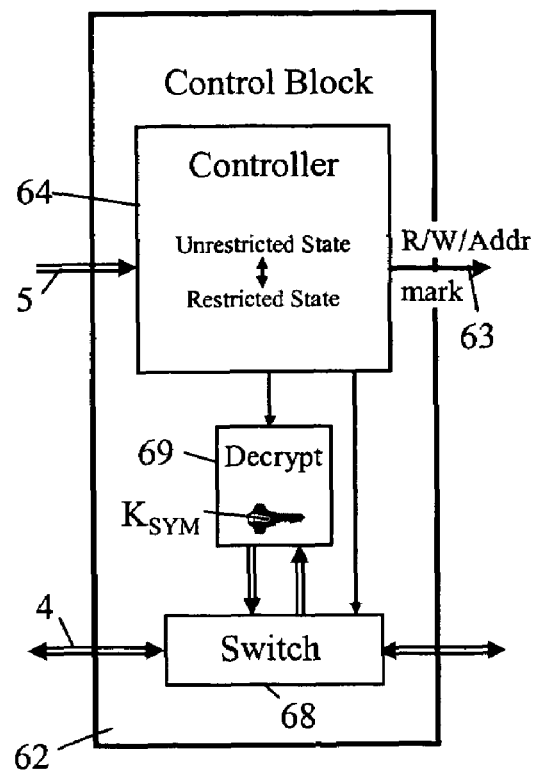
FIG. 7 is a block diagram of a control block of a memory device of a second embodiment of the invention.

FIG. 7 shows the form of control block 62 of memory device 60 for a second embodiment of the invention. The operation of this second embodiment is similar to that of the first embodiment except in the respects described below, and the variations (a) to (h) described above with respect to the first embodiment are generally applicable to the second embodiment (any adaptations required for the second embodiment will be apparent to persons skilled in the art).

In the second embodiment, authorised data sources such as the download stations 50 are arranged to output their content-item data in encrypted form, for example encrypted under a key $K_{SYM}$ of a symmetric cryptographic scheme. Since the content items are protected by encryption, the authorised data sources do not need to authenticate memory devices as genuine and so the control block 62 of the memory device does not need to be provided with functionality for authenticating itself to the download stations (however, similar functionality will still be needed when implementing certain of the variants (a) to (h) discussed above that require the device 60 to authenticate itself to a privileged entity). The FIG. 6 control block 62 is arranged to prevent the user of the device 60 from useably accessing the encrypted data present in the memory 3 whilst the controller 64 is in its restricted state 64; however, upon the controller changing to its unrestricted state, the data in memory 3 becomes useably accessible—that is, it becomes available in unencrypted form to the user.

More particularly, the control block 62 of FIG. 6 comprises the controller 64, a decryption unit 69, and a switch 68 inserted in the data channel 4 for selectively switching data being read from the memory 3 through the decryption unit 69 under the control of the controller 64. The decryption unit 69 holds the symmetric key $K_{SYM}$ in non-volatile internal memory. When the controller 64 is in its restricted state, it operates in the same way as for the first embodiment (apart from not needing to authenticate itself to the download stations). When the controller is in its unrestricted state, it causes encrypted data read from the memory to be decrypted by the decryption unit 69 before being output. The operation of the controller 64 is such that only data that has been stored to the memory 3 whilst the controller was in its restricted state 101, is passed to the unit 69 for decryption when being read from the memory; any data that the controller may have allowed to be written to the memory 3 whilst the controller 64 was not in its restricted state, is prevented by the controller's control of switch 68 from being decrypted by the unit 69. It is therefore not possible for a user to capture encrypted data from the download stations using a device other than a genuine memory device 60, store that data to the memory device 60 when the controller is in its unrestricted state (assuming this is permitted as in variation (d) above), and then read it out of the device 60 in unencrypted form.

One way of ensuring that only data written to the memory 3 when the controller is in its restricted state is decrypted by the unit 69, is not to implement variation (d) described above so that it is only possible to write to the memory 3 when in its restricted state 101. An alternative approach is to arrange for the controller 64 to cause indications to be stored in the memory 3 to distinguish data stored whilst the controller 64 is in its restricted state 101 from data stored to the memory 3 when the controller is not in state 101.

Provision is preferably made for the key $K_{SYM}$ held by the decryption unit 69 to be loaded into the unit 69 from an external entity; one reason to do this is to enable the key to be updated. Of course, the external entity will want to be able to authenticate the memory device as a genuine device 60 and the control block 62 is therefore provided with appropriate functionality, such as already described above, for authenticating itself to the external entity. In one form of the second embodiment of the memory device 60 where the variant (e) and/or (f) has been implemented to provide for re-entry of the controller 64 into its restricted state 101, each time the controller 64 re-enters its restricted state 101 the key $K_{SYM}$ held by the decryption unit 69 is arranged to be updated to the currently-operable version being used by the authorised data source entities; in the example exhibition-hall context, this is done by having a privileged entity such as the entry state-change entity 73 not only trigger transition of the controller 64 to its state 101 (assuming entity 73 has been authenticated to the device 60 and the conditions for transiting to state 101 have been met), but also pass the current form of the key $K_{SYM}$ to the control block 62 of the device (dashed arrow 110 in FIG. 5). Alternatively, rather than the current version of the key $K_{SYM}$ being passed to the device 60 when the controller enters its restricted state, the current version of the key can be passed to the device by an external entity used to trigger transition from the restricted state to the unrestricted state (see dashed arrow 111 in FIG. 5).

Other variants to the first and second embodiments are possible in addition to those described above. For example, the authentication mechanisms can simplified such as by using a single shared secret stored in all privileges entities, authorised data sources, and memory devices. Preferably such a shared secret is used as a cryptographic key so that it is not externally disclosed. Further simplification of the authentication mechanism is possible where the value of the content item data is low; in this case, authentication can be effected by providing ID codes for all privileges entities, authorised data sources, and memory devices, these IDs then being exchanged as the basis for authentication. Since the number of privileges entities and authorised data sources will generally be low, their IDs can easily be stored in each memory device, whilst the privileges entities and authorised data sources can either each hold all the memory device IDs or, preferably, be linked back by suitable communications means (such as a wireless LAN) to a central repository of the device IDs.

In the above-described embodiments the memory tags 5 have all used RFID technology. However, it is also possible to use memory tags which operate at other frequencies, outside the radio frequency range.

It is also possible to use other types of memory devices not based on memory tag technology. For example, a memory card or stick such as used in digital photography for the removable storage of image data in a camera can be adapted to provide embodiments of the present invention. As a further alternative, smart card technology can be employed to provided memory devices embodying the invention. In all such cases, the memory device will be provided with functionality corresponding to that of the control block 62 described above in relation to the memory tag embodiments.

The invention claimed is:

1. A standalone memory device comprising an external interface, a memory, and a control arrangement, the control arrangement being arranged when in a first state to enable data to be written via the external interface to the memory but to prevent a normal user from useably accessing that data through the external interface, and when in a second state to enable the user to useably access, via the interface, data stored in the memory; the control arrangement being further arranged to implement a prohibition or restriction on re-entry to its first state after having left it.

2. A device according to claim 1, wherein the control arrangement includes device authentication means for authenticating the device to an external data source.

3. A device according to claim 1, wherein the control arrangement includes source authentication means for authenticating an external data source as one authorised to write to the device when the control arrangement is in its first state, the control arrangement being arranged when in its first state to restrict the writing of data to the memory to data provided by an external data source that has been authenticated by the source authentication means.

4. A device according to claim 1, wherein the control arrangement includes privileged-entity authentication means for authenticating an external entity as one authorised to useably access data from the device when the control arrangement is in its first state, the control arrangement being arranged when in its first state to permit data from the memory to be useably accessed by an external entity that has been authenticated by the privileged-entity authentication means.

5. A device according to claim 1, wherein the control arrangement is arranged, at least when in its second state, to permit the user to write data via the external interface to the memory.

6. A device according to claim 1, wherein the control arrangement, when in its first state, is arranged to remain in that state until it receives a predetermined trigger via the external interface whereupon it transits to its second state.

7. A device according to claim 6, wherein the control arrangement includes privileged-entity authentication means for authenticating an external entity as a privileged entity, the control arrangement being arranged to respond to said predetermined trigger only when received from an entity authenticated by the privileged-entity authentication means as being a privileged entity.

8. A device according to claim 1, wherein the control arrangement, when in its first state, is arranged to remain in that state until it receives a predetermined internal trigger whereupon it transits to its second state, the control arrangement including a timer arranged to generate a said predetermined trigger after counting out a preset time.

9. A device according to claim 1, wherein the control arrangement is arranged to respond to a predetermined input received through the external interface from a privileged entity to modify or override its prohibition/restriction on re-entry to its first state.

10. A device according to claim 9, wherein the control arrangement includes privileged-entity authentication means for authenticating an external entity as a said privileged entity, the control arrangement being arranged to respond to said predetermined input only when received from an entity authenticated by the privileged-entity authentication means as being a privileged entity.

11. A device according to claim 10, wherein the control arrangement includes device authentication means for authenticating the device to an external data source on the basis of device-authentication data stored by the device authentication means, the control arrangement being arranged to receive said device-authentication data from said privileged entity in association with said predetermined input.

12. A device according to claim 1, wherein the control arrangement is arranged to implement said restriction on re-entry to its first state, said restriction comprising at least one of: an upper limit on the number of times the first state can be re-entered, an upper limit on the frequency at which the first state can be re-entered, an upper limit on the cumulative amount of data stored to the memory the or all times the control arrangement is in its first state.

13. A device according to claim 12, wherein the control arrangement is arranged to respond to a specific internal prompt to transit to its first state, subject to said restriction, and to take account of this transition when considering said restriction in relation to a next prompt; the control arrangement including a timer arranged to generate a said specific internal prompt after counting out a preset time.

14. A device according to claim 12, wherein the control arrangement is arranged to respond to a specific external prompt to transit to its first state, subject to said restriction, and to take account of this transition when considering said restriction in relation to a next prompt.

15. A device according to claim 13, wherein the control arrangement includes privileged-entity authentication means for authenticating an external entity as a said privileged entity, the control arrangement being arranged to respond to said specific external prompt only when received from an entity authenticated by the privileged-entity authentication means as being a privileged entity.

16. A device according to claim 13, wherein the control arrangement includes device authentication means for authenticating the device to an external data source on the basis of device-authentication data stored by the device authentication means, the control arrangement being arranged to receive said device-authentication data from said privileged entity in association with said specific external prompt.

17. A device according to claim 1, wherein the control arrangement includes capacity-limiting means arranged to artificially restrict the capacity of the memory in dependence on input received via the external interface from a privileged entity.

18. A device according to claim 17, wherein the control arrangement includes privileged-entity authentication means for authenticating an external entity as a said privileged entity, the capacity-limiting means being arranged to take account of said input only when received from an entity authenticated by the privileged-entity authentication means as being a privileged entity.

19. A device according to claim 1, wherein the control arrangement includes device authentication means for authenticating the device to an external data source; the control arrangement being arranged when in its first state to prevent read access to the memory by said user.

20. A device according to claim 1, wherein the control arrangement includes decryption means for decrypting data stored in encrypted form in the memory; the control arrangement being arranged, when in its second state but not when in its first state, to respond to a user read access request to cause the decryption means to decrypt encrypted data read from the memory whereby to render that data useably accessible to the user; the control arrangement being further arranged to limit decryption by the decryption means to encrypted data that was stored to the memory whilst the control arrangement was in its first state.

21. A device according to claim 20, wherein the control arrangement is arranged to prevent the writing of data to the memory when the control arrangement is not in its first state.

22. A device according to claim 20, wherein the control arrangement is arranged to cause indications to be stored in the device to distinguish data stored to the memory whilst the control arrangement is in its first state from other data stored to the memory.

23. A device according to claim 20, wherein the control arrangement includes device authentication means for authenticating the device to an external entity, and privileged-entity authentication means for authenticating an external entity as a privileged entity; the control arrangement being arranged to transit to its first state in response to input, comprising a decryption key, from a said external entity authenticated by the privileged-entity authentication means as being a privileged entity; the decryption means being arranged to subsequently use the received decryption key to decrypt encrypted data stored in the memory.

24. A device according to claim 20, wherein the control arrangement includes device authentication means for authenticating the device to an external entity; the control arrangement, when in its first state, being arranged to transit to its second state in response to input, comprising a decryption key, from said external entity; the decryption means being arranged to use the received decryption key to decrypt encrypted data stored in the memory.

25. A device according to claim 1, wherein the device is in the form of a radio-frequency memory tag embedded in or attached to a base medium.

26. A system comprising:
    at least one standalone memory device comprising:
        an external interface,
        a memory, and
        a control arrangement including a device authentication arrangement for authenticating the device to an external data source, the control arrangement being arranged when in a first state to enable data to be written via the external interface to the memory but to prevent read access to the memory by a normal user through the external interface, and when in a second state to enable the user to read, via the interface, data stored in the memory;
    the control arrangement being further arranged to implement a prohibition or restriction on re-entry to its first state after having left it; and
    a data source comprising:
        a checking arrangement arranged to interacting with the device authentication arrangement of a said at least one memory device presented to it whereby to check the authenticity of the device, the checking arrangement being further arranged to check the current state of the control arrangement of the presented device, and
        a download arrangement for downloading data to the presented device subject to the checking arrangement satisfactorily authenticating the device and finding the control arrangement of the device to be in its first state.

27. A system according to claim 26, further comprising one or more privileged entities for interacting with a said standalone memory device to modify or override the aforesaid prohibition or restriction on the device re-entering its first state.

28. A system according to claim 26, further comprising, one or more privileged entities for interacting with a said standalone memory device to change the current state of the control arrangement of that device.

29. A device according to claim 1, wherein the control arrangement is responsive to externally applied control signals received via said external interface.

30. A device according to claim 1 wherein the control arrangement and the memory are mounted on a common base medium.

31. A device according to claim 30 wherein the base medium comprises an entry ticket to an exhibition and wherein the memory selectively receives data from download stations at said exhibition while in said first state.

* * * * *